United States Patent [19]
Atsuta

[11] Patent Number: 6,121,714
[45] Date of Patent: *Sep. 19, 2000

[54] VIBRATION TYPE MOTOR DEVICE

[75] Inventor: Akio Atsuta, Yokosuka, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/967,610

[22] Filed: Nov. 10, 1997

[30] Foreign Application Priority Data

Nov. 13, 1996 [JP] Japan .................................. 8-301832

[51] Int. Cl.[7] .................................................. H01L 41/08
[52] U.S. Cl. ................................ 310/316.01; 310/316.02
[58] Field of Search .................... 318/116–118; 310/316, 310/317, 319, 316.01, 316.02

[56] References Cited

U.S. PATENT DOCUMENTS

| | | | |
|---|---|---|---|
| 4,713,571 | 12/1987 | Suzuki et al. | 310/316 |
| 4,727,276 | 2/1988 | Izukawa et al. | 310/316 |
| 4,952,834 | 8/1990 | Okada | 310/316 |
| 5,099,180 | 3/1992 | Noguchi | 318/116 |
| 5,134,333 | 7/1992 | Atsuta | 310/323 |
| 5,231,325 | 7/1993 | Tamai et al. | 310/323 |
| 5,247,221 | 9/1993 | Atsuta | 310/323 |
| 5,298,829 | 3/1994 | Tsukimoto et al. | 310/323 |
| 5,300,850 | 4/1994 | Okumura et al. | 310/323 |
| 5,612,598 | 3/1997 | Fukui et al. | 318/116 |
| 5,656,881 | 8/1997 | Atsuta | 310/316 |
| 5,744,897 | 4/1998 | Takagi et al. | 310/316 |
| 5,767,609 | 6/1998 | Suganuma | 310/316 |

FOREIGN PATENT DOCUMENTS 3-289375  12/1991  Japan .

*Primary Examiner*—Mark O. Budd
*Attorney, Agent, or Firm*—Fitzpatrick, Cella, Harper & Scinto

[57] ABSTRACT

This invention relates to a vibration type motor which is driven by applying a driving voltage to an electro-mechanical energy conversion element at a floating state. A motor of this type suffers a problem of changes in driving power in correspondence with power supply voltage drifts.

This invention provides a vibration type motor device, which changes the pulse width in correspondence with changes in power supply voltage, and is then floating-driven by a pulse signal with the changed pulse width so as to attain driving by constant electric power independently of changes in voltage.

22 Claims, 10 Drawing Sheets

VIBRATION TYPE MOTOR DEVICE

BACKGROUND OF THE INVENTION

1. Field of the Invention

The present invention relates to a vibration type motor which utilizes resonance of a vibration member.

2. Related Background Art

In recent years, vibration wave (vibration type) motors called ultrasonic wave motors or piezoelectric motors have been developed and put into practical applications by the present applicant and others. As is well known, a vibration wave motor is a non-electromagnetic driving type motor that picks up, as continuous mechanical motion, high-frequency vibrations produced by applying AC voltages to electro-mechanical energy conversion elements such as piezoelectric elements, electrostrictive elements, or the like. Since the principle of operation of this motor H as already been explained in many patents, such as Japanese Patent Laid-Open Application No. 3-289375, and the like, a detailed description thereof will be omitted.

FIG. 10 is a side view of a conventional rod-like ultrasonic wave motor and a diagram showing the wiring layout for supplying voltages to and picking up an output voltage from piezoelectric elements which are mounted in the motor. A vibration member 101 is included in the rod-like ultrasonic wave motor, and comprises a coupled body of piezoelectric elements or electrostrictive elements and an elastic member. A rotor 102 contacts the upper portion of the vibration member 101.

A piezoelectric element portion of the vibration member 101 comprises A-phase driving piezoelectric elements a1 and a2, B-phase driving piezoelectric elements b1 and b2, and a vibration detection piezoelectric element s1. When an A-phase application voltage is applied to a metal plate sandwiched between the A-phase piezoelectric elements a1 and a2, and a B-phase application voltage is applied to a metal plate sandwiched between the A-phase piezoelectric elements b1 and b2, the piezoelectric elements are driven. The outer surfaces of the A-phase piezoelectric elements a1 and a2, and B-phase piezoelectric elements b1 and b2 are connected to the ground potential (GND). Similarly, one surface (the B-phase side in FIG. 10) of the vibration detection piezoelectric element s1 also is connected to the GND potential, and a signal is picked up from the surface opposite to the GND side. The signal pickup surface side of the vibration detection piezoelectric element s1 contacts a metal block, which is insulated from the GND potential by an insulating sheet. Hence, an output voltage corresponding to vibrations generated in the vibration detection piezoelectric element s1 is directly obtained from the vibration detection piezoelectric element s1. The resonance frequency or the like is calculated, e.g., based on the magnitude of the output voltage, the phase difference from the driving voltage, and the like.

FIG. 11 shows a driving circuit for the ultrasonic wave motor.

A- and B-phase signals are applied via driving electrodes A-d and B-d (see FIG. 1) for applying AC voltages to the piezoelectric elements or electrostrictive elements. The circuit shown in FIG. 11 includes a control circuit (to be referred to as a control microcomputer hereinafter) 11 for controlling driving of the motor, an oscillator (e.g., a voltage-controlled oscillator (VCO) or the like) 2 for generating an AC voltage, a 90° phase shifter 3, switching circuits 4 and 5 for switching power supply voltages using the AC voltages from the oscillator and phase shifter, inductance elements 6 and 7 for attaining impedance matching with the motor, and a phase difference detector 8 for detecting a signal phase difference $\theta_{A-S}$ between a driving signal A and a vibration detection signal S.

Conventionally, the power supply voltage to be switched by the switching circuits 4 and 5 may be as high as several 10 volts, but an ultrasonic wave motor that can be driven at low voltages also is available since the piezoelectric elements have been improved.

In an ultrasonic wave motor that can be driven at low voltages, the power supply may comprise a dry cell, battery, or the like, and the power supply voltage of which may change with time. Consequently, the input power to the motor changes, and the motor cannot be stably driven.

As described above, when the motor is driven using the switching circuits shown in the prior art, the input power to the motor changes in response to drifts of the power supply voltage, and it is impossible to drive the motor by constant input power.

SUMMARY OF THE INVENTION

One aspect of the application provides a vibration type motor device, which has a vibration member having an electromechanical energy conversion element, and obtains a driving force by applying a frequency signal to the electromechanical energy conversion element. The device comprises a driving circuit for forming the frequency signal to be applied to the electromechanical energy conversion element on the basis of an input pulse signal, and a pulse width changing circuit for changing the pulse width of the pulse signal in accordance with a power supply voltage value of the driving circuit, whereby the motor device can be driven by constant input power independently of drifts of the voltage value.

One aspect of the application provides a vibration type motor device, which has a vibration member having an electro-mechanical energy conversion element, and obtains a driving force by applying a frequency signal to the electromechanical energy conversion element. The device comprises a driving circuit for applying a first pulse signal to one surface of the electromechanical energy conversion element, and a second pulse signal, the phase of which is different from that of the first pulse signal, to the other surface of the electro-mechanical energy conversion element. The device further includes a pulse width changing circuit for changing the pulse width of at least one of the first and second pulse signals in accordance with the power supply voltage value of the driving circuit, whereby the motor device can be driven by constant input power independently of drifts of the voltage value.

To achieve the above objects, one aspect of the application broadens the pulse width in the pulse width changing circuit as the power supply voltage value decreases.

In consideration of the above objects, one aspect of the application provides a vibration type motor device, which can perform flexible pulse control in response to changes in voltage. The pulse width changing circuit forms the pulse signal by variably alternating a wide pulse having a pulse width greater than a nominal pulse width used when the power supply voltage value is higher than a first value, and a narrow pulse having a pulse width less than the wide nominal pulse when the power supply voltage value is lower than a second value.

In consideration of the above objects, one aspect of the application provides a vibration type motor device which can realize smooth startup driving of the motor device since the pulse width changing circuit sets a constant pulse width at start-up of the motor device, and begins pulse width control on the basis of the voltage level value after the motor device completes start-up using the constant pulse width.

In consideration of the above objects, one aspect of the application provides a vibration type motor device which can realize smooth shutdown control, since the pulse width changing circuit changes from controlling the pulse width or the basis of the voltage level value to applying a constant pulse width upon shutdown of the motor device.

Other objects of the present invention will become apparent from the following description of the embodiments taken in conjunction with the accompanying drawings.

DESCRIPTION OF THE EMBODIMENT OF THE INVENTION

FIRST EMBODIMENT

Figure 1:
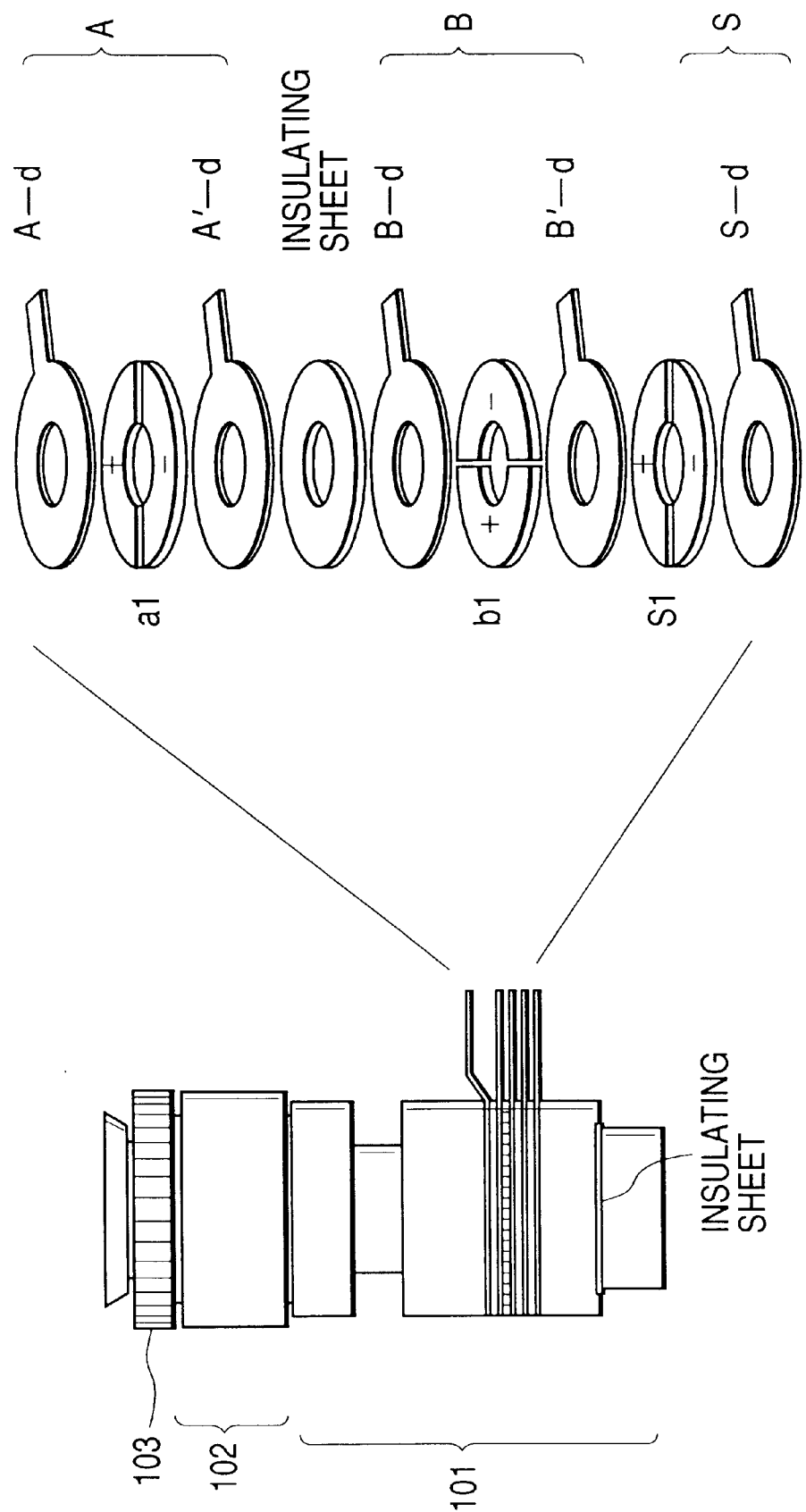
FIG. 1 is a side view showing the arrangement of a vibration type motor used in the first embodiment of the present invention.

FIG. 1 shows the arrangement of a motor used in the first embodiment.

Figure 10:
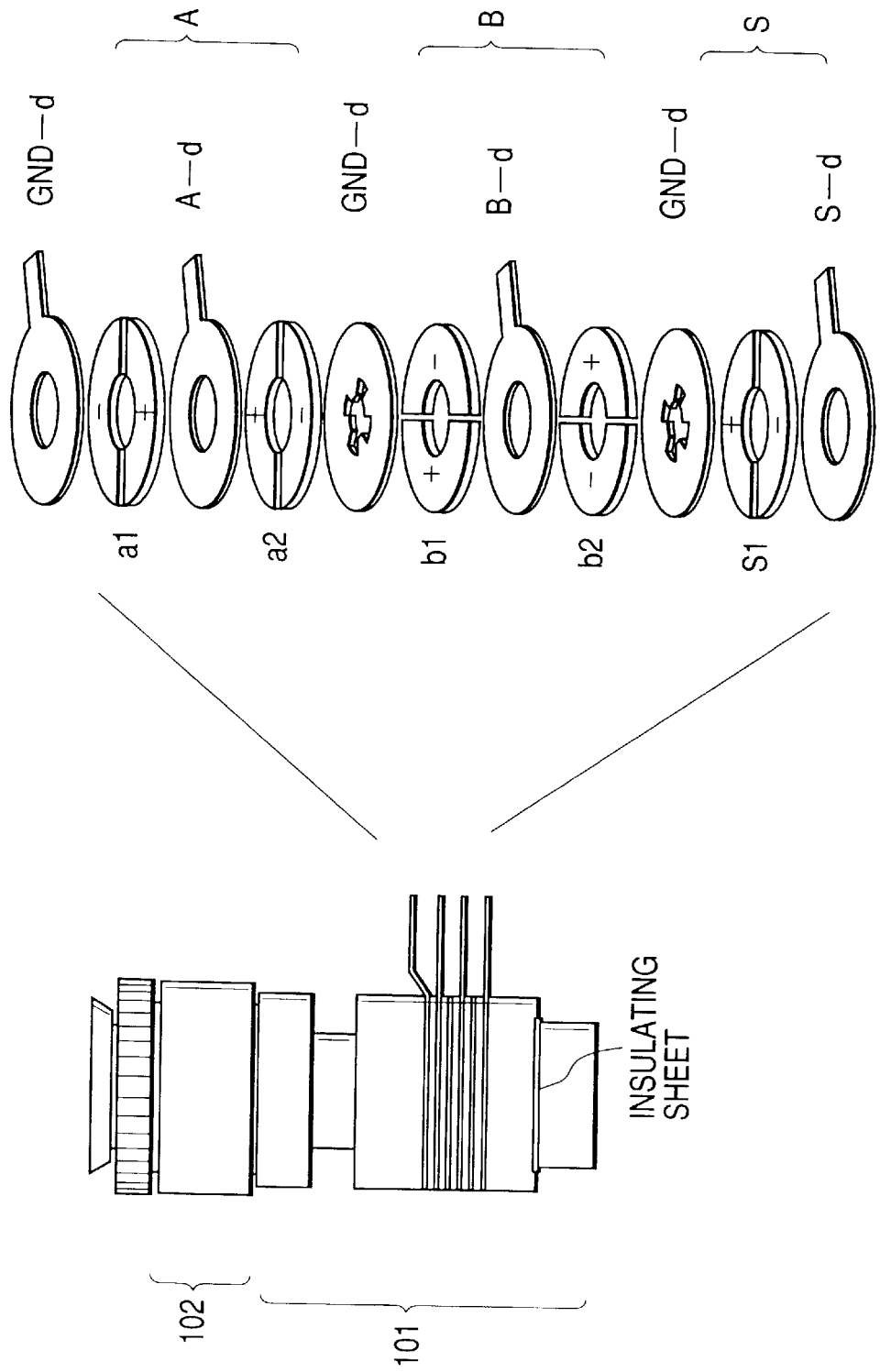
FIG. 10 is a side view showing the arrangement of a conventional rod-like ultrasonic wave motor.

Like reference numerals in FIG. 1 denote the same parts as in FIG. 10.

The electrode plates respectively sandwich piezoelectric elements a1 and b1 to drive them in four phases (A, A', B, and B' in FIG. 2) without common electrodes (GND).

With this arrangement, when driving signals having opposite phases and duty cycles of 50% are applied to these phases A and A', and B and B', this motor can be driven at the same power supply voltage as that of the conventional arrangement although the number of piezoelectric elements per phase is reduced from two to one.

Figure 2:
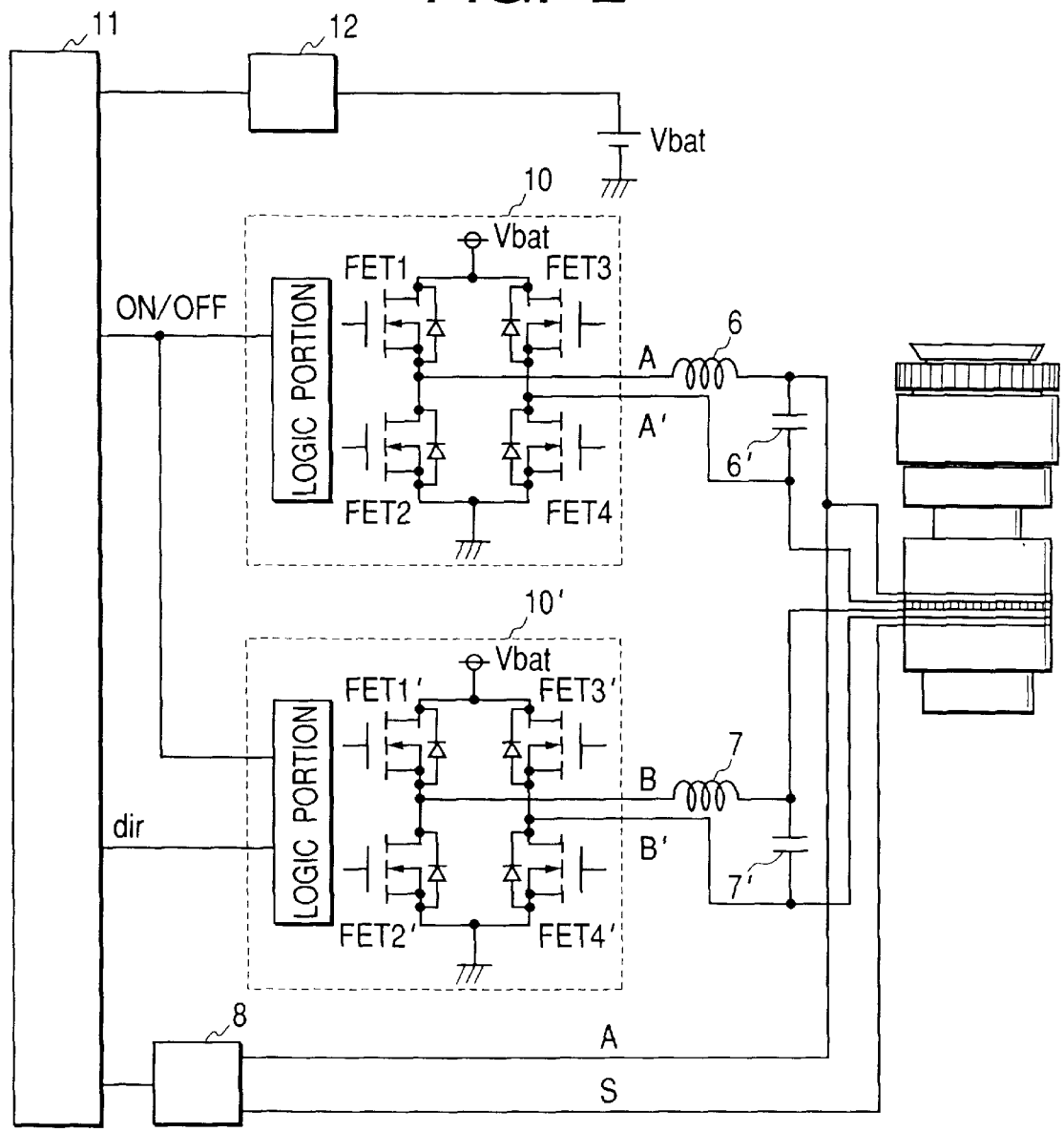
FIG. 2 is a block diagram showing the circuit arrangement according to the first embodiment of the present invention.

FIG. 2 is a block diagram of a driving circuit used in the first embodiment.

Figure 11:
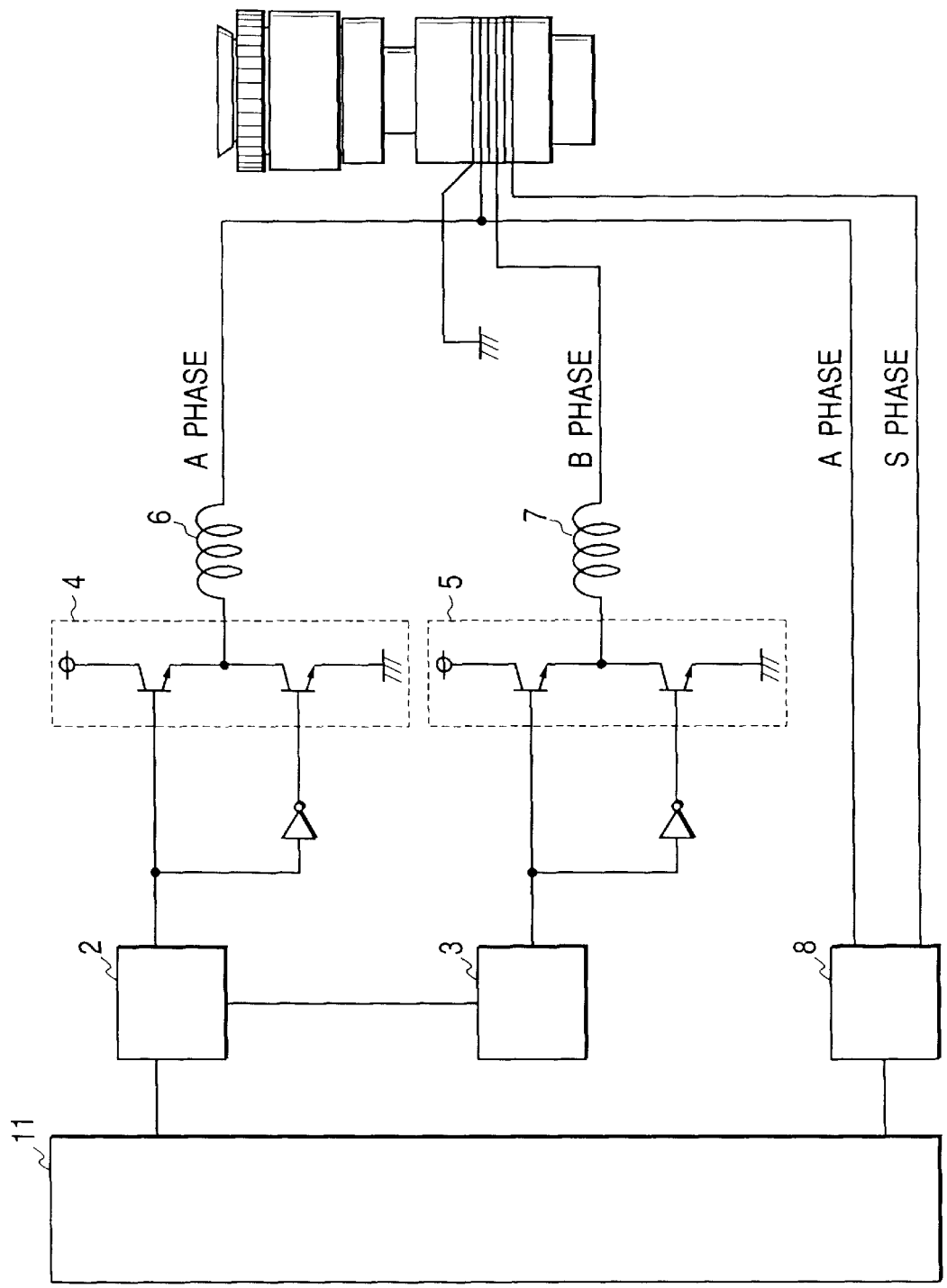
FIG. 11 is a block diagram showing the circuit arrangement of the prior art shown in FIG. 10.

Like reference numerals in FIG. 2 denote the same parts as in FIG. 11.

In this embodiment, in each of switching circuits 10 and 10', FETs with a small ON resistance replace the transistors of the circuit of FIG. 11. A reverse current diode is connected to each FET to prevent damage due to reverse currents.

Impedance elements 6, 6', 7, and 7' attain impedance matching with the motor. In this embodiment, elements 6 and 7 are inductors and elements 6' and 7' are capacitors. In the conventional 4-phase driving method of FIG. 11 as well, the motor can be more efficiently driven at low voltages by adding impedance elements at the positions of 6, 6', 7, and 7' (note that the capacitors 6' and 7' need not always be added).

A voltage detection means (e.g., an A/D converter) 12 detects the magnitude Vbat of the power supply voltage of the switching circuits, and supplies the magnitude to a control microcomputer 11.

Figure 3:
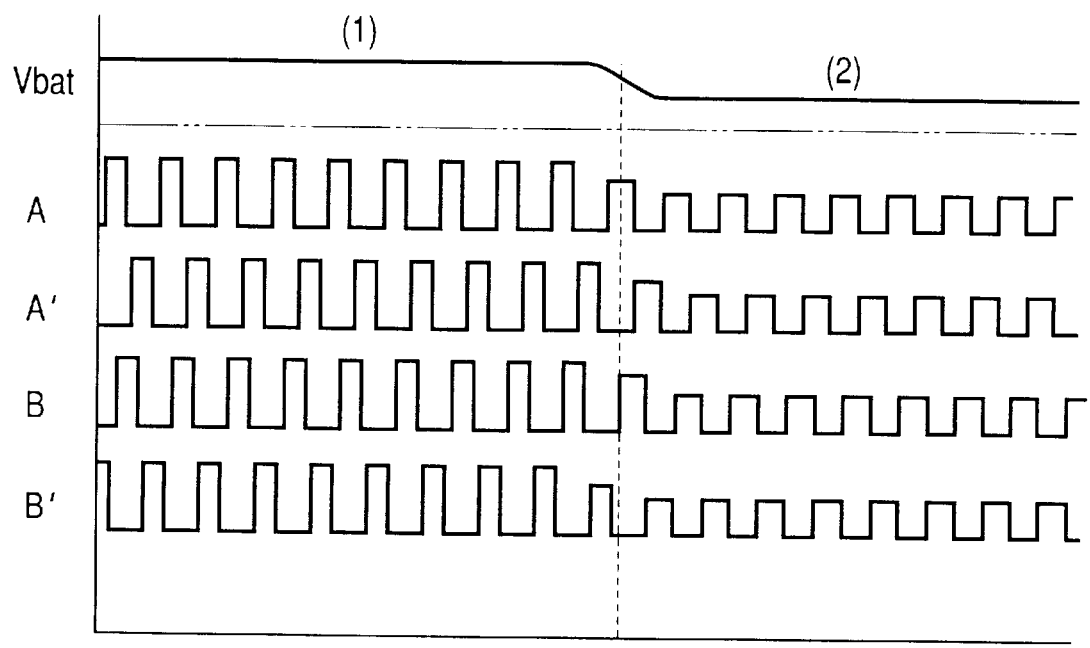
FIG. 3 is a waveform chart showing the relationship between the magnitude Vbat of the power supply voltage (measured at the switching circuit) and the ON-OFF timings of the outputs from switching circuits 10 and 10' in the first embodiment of the present invention.

FIG. 3 shows the relationship between the magnitude Vbat of the power supply voltage and the ON-OFF timings of the outputs from the switching elements 10 and 10'. FET1, FET2, FET3, and FET4 make up the switching circuit 10. Signal A is set to Hi when FET1 is ON and FET2 is OFF, and set to Lo when FET2 is ON and FET1 is OFF. Similarly, signal A' is set to Hi when FET3 is ON and FET4 is OFF, and set to Lo when FET4 is ON and FET3 is OFF. The FETs of the switching circuit repetitively switch signals A and A' (shown in FIG. 2) to Hi or Lo according to the timings shown in FIG. 3.

That is, A Hi (FET1, ON, FET2, OFF) and A Lo (FET1, OFF, FET2, ON) are alternately repeated, and A' Hi (FET3, ON, FET4, OFF) and A' Lo (FET3, OFF, FET4, ON) are alternately repeated; a logic portion of the switching circuit 10 controls the individual FETs so that the signals A and A' have a 180' phase difference.

Similarly, FET1', FET2', FET3'and FET4' of the switching circuit 10' are controlled in the same manner, i.e., they are controlled by a logic portion, so that signals B and B' change at the timings shown in FIG. 3.

Note that a direction controlling signal, "dir", input from the microcomputer 11 to the switching circuit 10' enables normal or reverse rotation. When a normal rotation signal is input to the switching circuit 10', the circuit 10' controls the FETs, so that the phases of the signals B and B' lag 90° behind the phases of signals A and A', respectively. When a reverse rotation signal is input to the switching circuit 10', the circuit 10' controls the FETs, so that the phases of the outputs B and B' lead by 90' those of switching pulses A and A', respectively. The microcomputer 11 supplies a signal for controlling the ON time of the FETs of the switching circuits 10 and 10' to the logic portions in accordance with the level of the power supply voltage Vbat input from the voltage detection means 12, thereby controlling the pulse widths of the signals A, A', B, and B' output from the circuits 10 and 10', so that the pulse width of the signal gets broader as the voltage level decreases, as shown in FIG. 3.

More specifically, when voltage Vbat is high, as in range (1) in FIG. 3, the pulse width of this signal from the switching circuits is set to a narrow pulse width, which decreases the input power to the motor compared to a wider pulse width. Hence, the input power can be set to a particular power value that is not excessive.

On the other hand, when voltage Vbat is low, as in range (2) in FIG. 3, the pulse width of the signal from the switching circuits is set to a wide pulse width. In this manner, the input power to the motor is increased, and can be set, e.g., to the same power value as in case of range (1).

Figure 4:
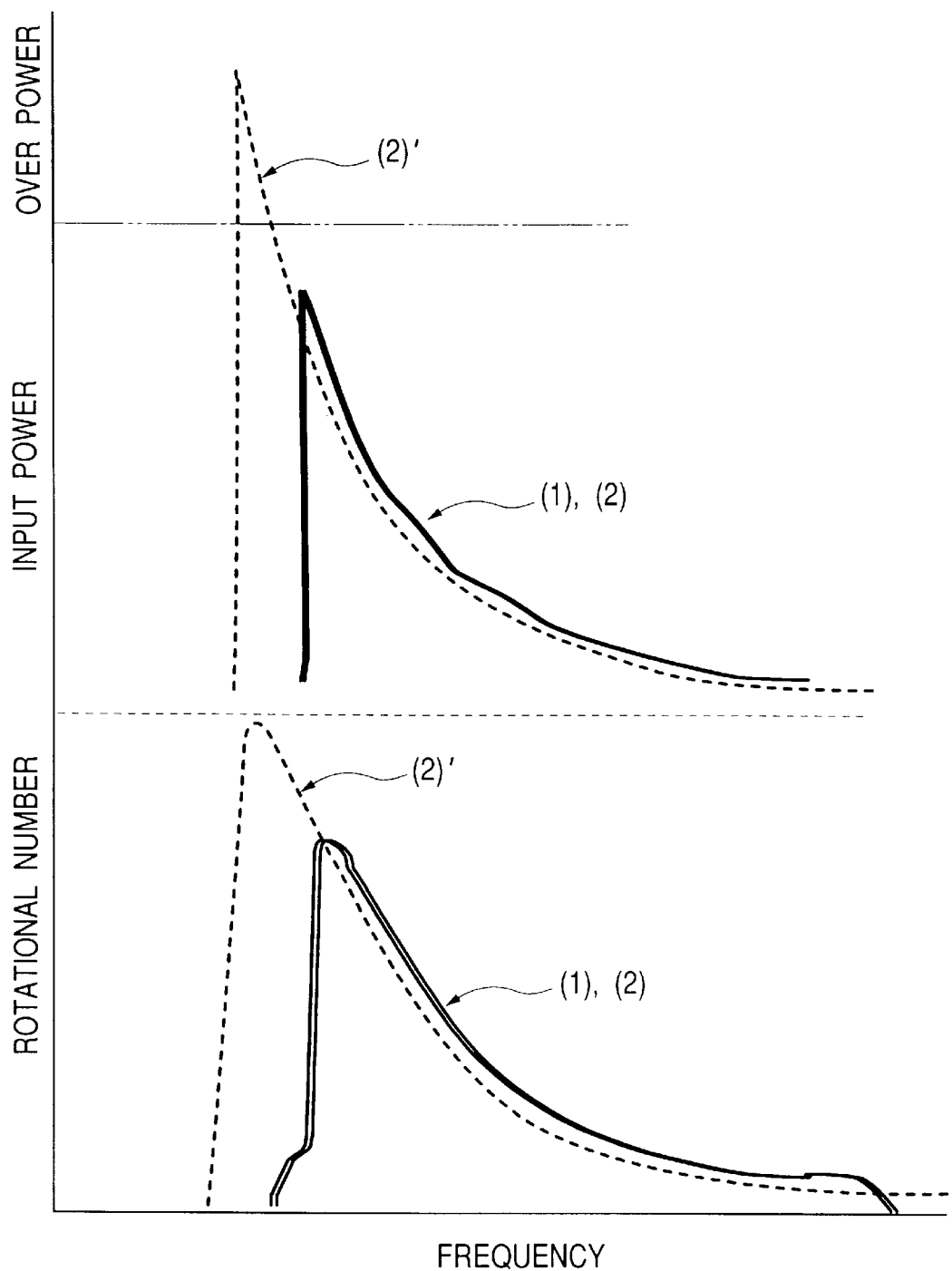
FIG. 4 graphically illustrates relationships among the driving frequency, input power, and rotational number of the motor in the first embodiment of the present invention.

FIG. 4 shows the relationships among the frequency, input power, and rotational number of the ultrasonic wave motor when this embodiment is used. In this embodiment, since the pulse width is controlled to obtain the same input power independently of the level of the power supply voltage (ranges (1) or (2) in FIG. 3), as described above, the input power remains constant.

When the pulse width is not controlled and the power supply voltage is high, the ultrasonic wave motor has characteristics (2)'. The input power is not excessive in the high-frequency range, but it exceeds a predetermined power level, i.e., an overpower limit, in the low-frequency range. When the input power exceeds the overpower limit, the power supply or other circuits may fail or be damaged.

As described above, in this embodiment, since the pulse width is controlled, the input power can be made constant independently of drifts of the power supply voltage, thus preventing the input power from exceeding the overpower limit and allowing the motor to be driven with uniform characteristics.

SECOND EMBODIMENT

Figure 5:
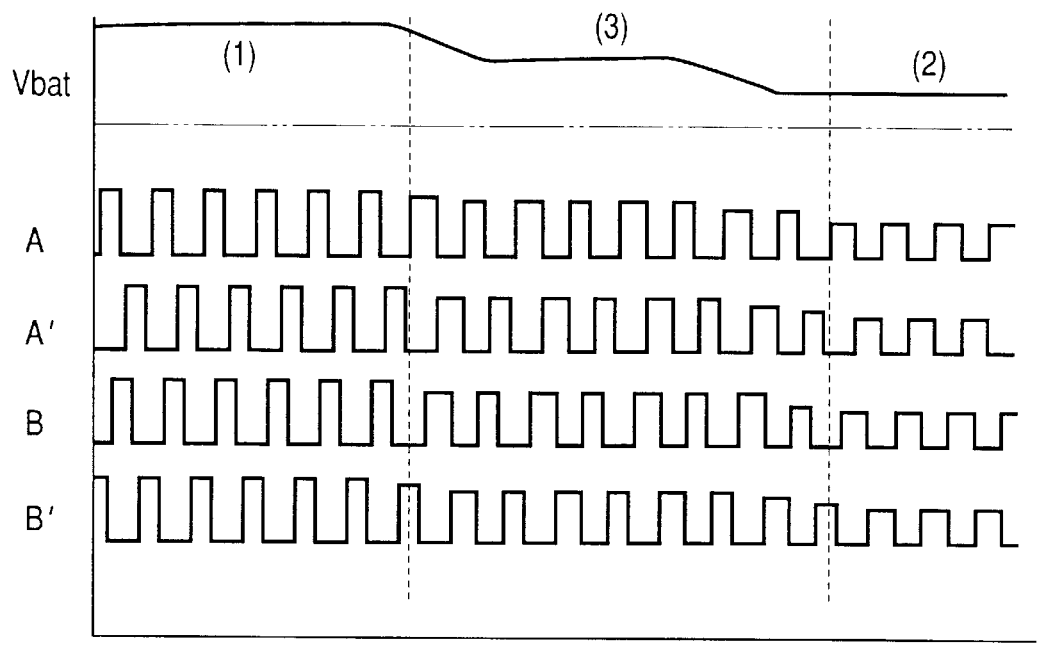
FIG. 5 is a waveform chart showing the relationship between the magnitude Vbat of the power supply voltage (measured at the switching circuit) and the ON-OFF timings of the outputs from the switching circuits 10 and 10' in the second embodiment of the present invention.

FIG. 5 shows the relationship between the magnitude Vbat of the power supply voltage of the switching circuit, and the ON-OFF timings of the outputs from the switching elements 10 and 10' in the second embodiment of the present invention. Note that this embodiment also uses the motor and circuit arrangements shown in FIGS. 1 and 2.

In this embodiment, when the voltage Vbat falls within range (1) or (2), the pulse width is controlled to obtain constant input power in the same manner as in the control example shown in FIG. 3. However, when the voltage falls within a range (3), an intermediate level range between ranges (1) and (2), the microcomputer 11 supplies a control signal to the switching circuits 10 and 10', so that signals A, A', B, and B' alternately have a narrow pulse width and a wide pulse width, as generated in ranges (1) and (2), respectively. In this manner, even though the pulse width is not finely changed (e.g., continuously adjusted) in response to changes in voltage Vbat, substantially the same characteristics as those obtainable by an intermediate pulse width having a pulse width between the narrow pulse width and the wide pulse widths of ranges (1) and (2), respectively, can be obtained within range (3), and the input power to the motor can be obtained to drive the motor with the same characteristics as in ranges (1) and (2).

In this embodiment, the alternating pulse widths in range (3) are generated at a 1:1 ratio. Alternatively, the microcomputer 11 may control the ratio of the pulse widths generated in accordance with ranges (1) and (2) in correspondence with changes in the voltage level, so that the ratio of wide pulse widths generated in accordance with range (2) increases as the voltage level decreases from the value of range (1) to the value of range (2), thus coping with finer drifts of the power supply voltage.

As an example of the above-mentioned operation control, when the voltage level detected by the detection means falls within a predetermined range (e.g., between voltages $V_1$ and $V_2$), the microcomputer 11 supplies a control signal to the switching circuit 10 and 10' so as to generate a narrow pulse width for range (1). When the voltage level is lower than $V_2$ and higher than $V_3$, the microcomputer 11 generates an instruction signal which increases the number of pulse width instructions for generating pulses having a wide pulse width, as in range (2) as compared with the number of pulse width instructions generating a narrow pulse width, as in range (1), as the voltage level changes from $V_2$ to $V_3$. When the voltage level is lower than $V_3$ and higher than $V_4$, the microcomputer supplies pulse width instructions for a wide pulse width for range (2) to the switching circuits 10 and 10'. In this manner, the above-mentioned constant input power control is realized.

THIRD EMBODIMENT

Figure 6:
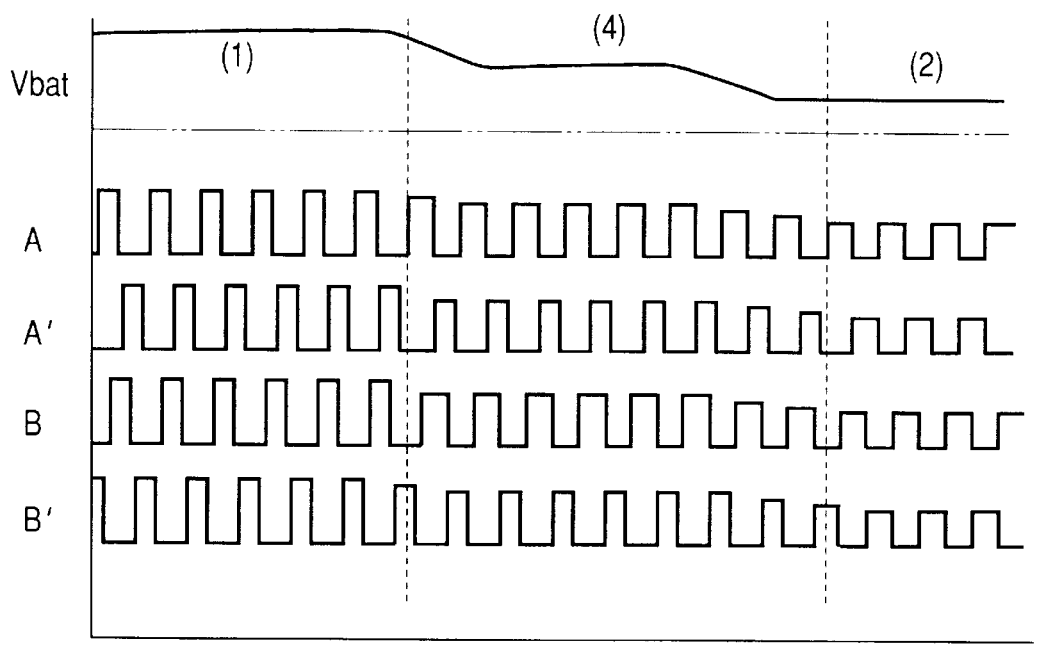
FIG. 6 is a waveform chart showing the relationship between the magnitude Vbat of the power supply voltage (measured at the switching circuit) and the ON-OFF timings of the outputs from the switching circuits 10 and 10' in the third embodiment of the present invention.

FIG. 6 shows the relationship between the magnitude Vbat of the power supply voltage of the switching circuit, and the ON-OFF timings of the outputs from the switching elements 10 and 10' in the third embodiment of the present invention.

In this embodiment, when the voltage level detected by the detection means 12 falls within range (1) or (2), the pulse widths are controlled in the same manner as in the first embodiment. However, when the voltage level falls within an intermediate range (4), between ranges (1) and (2), the microcomputer 11 supplies an instruction signal to the switching circuits 10 and 10', so that the signals A' and B' have a narrow pulse width, as in range (1), and signals A and B have a wide pulse width range (2). In this manner, characteristics can be obtained that are the same as those obtained when the motor is driven by an intermediate pulse width (i.e., a pulse width between the narrow pulse width of range (1) and the wide pulse width of range (2), and a constant input power to the motor can be obtained even when the power supply voltage falls within the intermediate range between ranges (1) and (2), thus driving the motor with the same characteristics as in ranges (1) and (2).

In this embodiment, in range (4) signals A' and B' are generated to have a narrow pulse width, as in range (1), and signals A and B are generated to have a wide pulse width, as in range (2). Alternatively, three out of the four phase signals may have a narrow pulse width, as in range (1), and the remaining signal may have a wide pulse width, as in range (2) in accordance with the detected voltage level, thus accommodating finer drifts of the power supply voltage.

Figure 7:
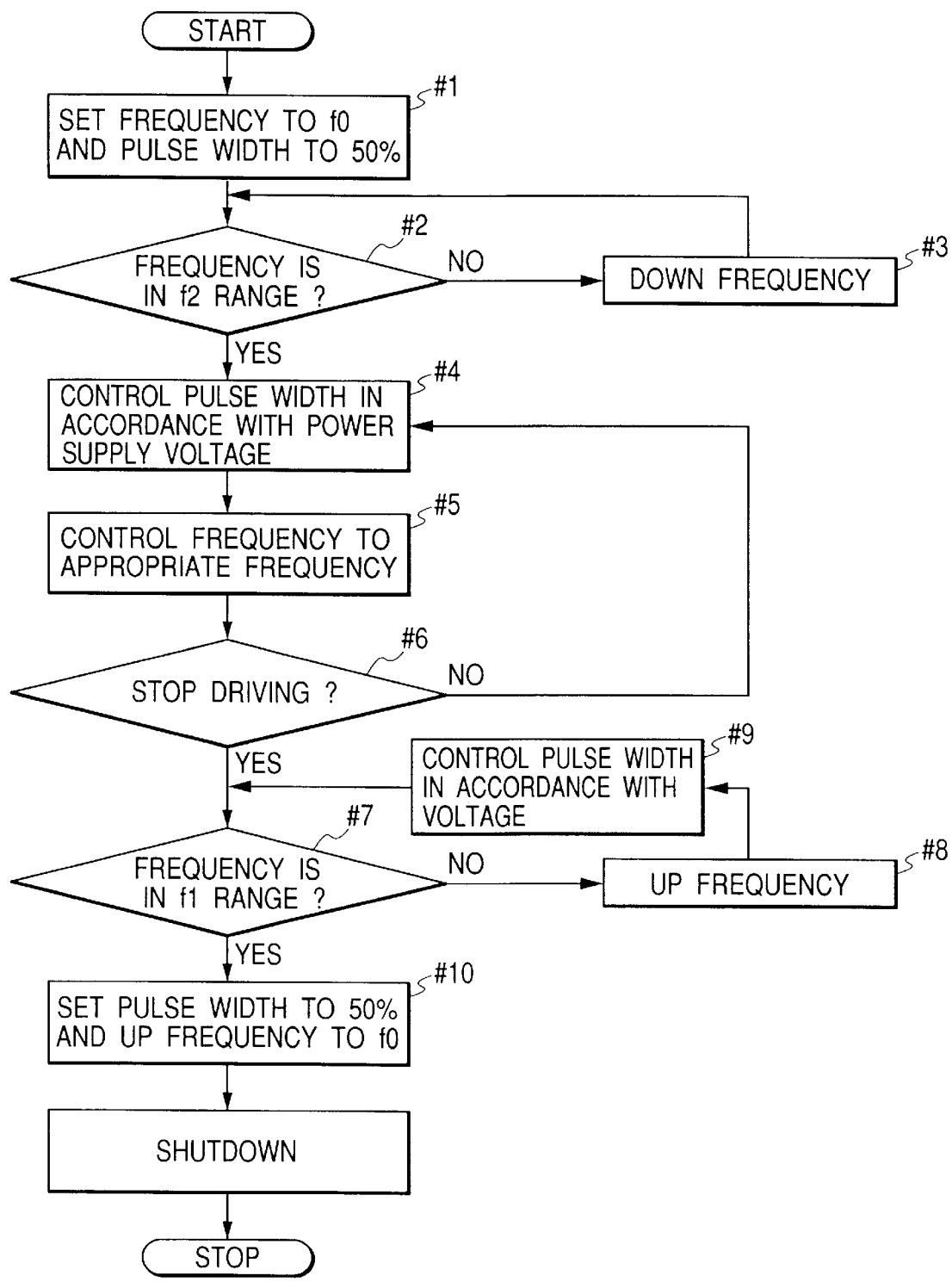
FIG. 7 is a flow chart for explaining the operation of the motor of the present invention.

FIG. 7 is a flow chart for explaining the operation of the control of the motor when driving control using each of the above embodiments is used, and the control flow is controlled by the microcomputer 11 shown in FIG. 2.

Figure 8:
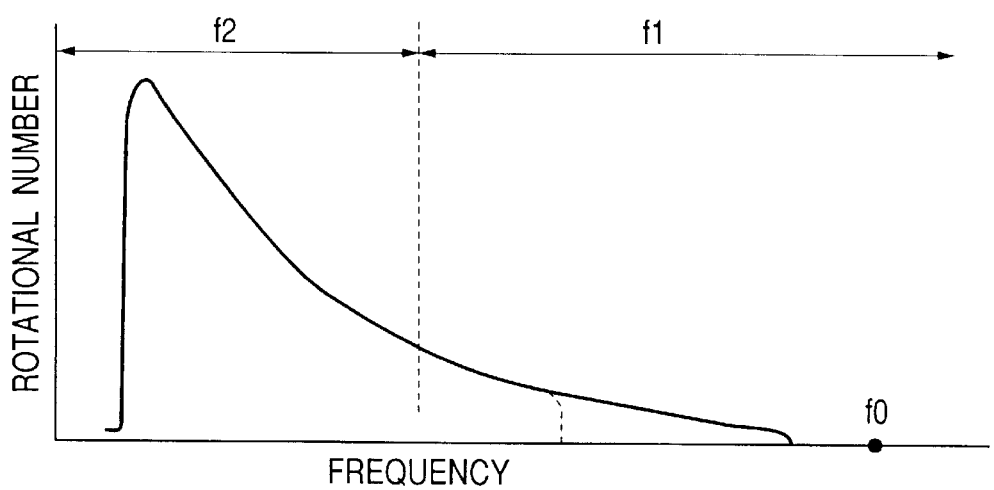
FIG. 8 graphically illustrates the relationship between the driving frequency and rotational number of the motor according to the flow chart shown in FIG. 7.

The control operation of the motor will be explained below with reference to FIGS. 7 and 8.

An initial frequency $f_0$ is set, and the pulse width is set at 50% (step #1).

When the rotational speed of the motor has reached a given speed, the frequency of the driving signal is gradually lowered to frequency range $f_2$ while the pulse width set in step #1 remains constant (steps #2, #3).

When the frequency of the driving signal reaches a frequency in frequency range $f_2$, the frequency of the driving signal thus is further decreased to a predetermined frequency while the pulse width is controlled in accordance with the power supply voltage level by a method described in one of the above embodiments (steps #4, #5, #6).

When a shutdown instruction of the motor is issued, the frequency of the driving signal is increased to a frequency in frequency range f, while continuing to control the pulse width in accordance with the above-mentioned pulse width control method (steps #6, #7, #8, #9).

When the frequency of the driving signal reaches a frequency in frequency range $f_1$, the pulse width is set at 50%, and the frequency of the driving signal is further increased to $f_0$ (Step #10).

In this manner, when the motor is started, the pulse width of the driving signal is fixed until either the frequency of the driving signal reaches a frequency in the predetermined frequency range $f_2$, or the rotational speed reaches a predetermined value, and thereafter, one of the above-mentioned methods of pulse width control in accordance with the power supply voltage level 1 is started. By contrast, if a method of controlling pulse width in accordance with level 1 is done beginning at $f_0$, a range in which the speed changes abruptly appears at the high frequency end of the rotational number characteristic, as indicated by the dotted curve in FIG. 8. However, with the above-mentioned method, as indicated by the solid curve in FIG. 8, smooth start-up control can be realized and the problem of excessive power at start-up can be prevented. Furthermore, smooth shutdown control can be similarly realized.

Figure 9:
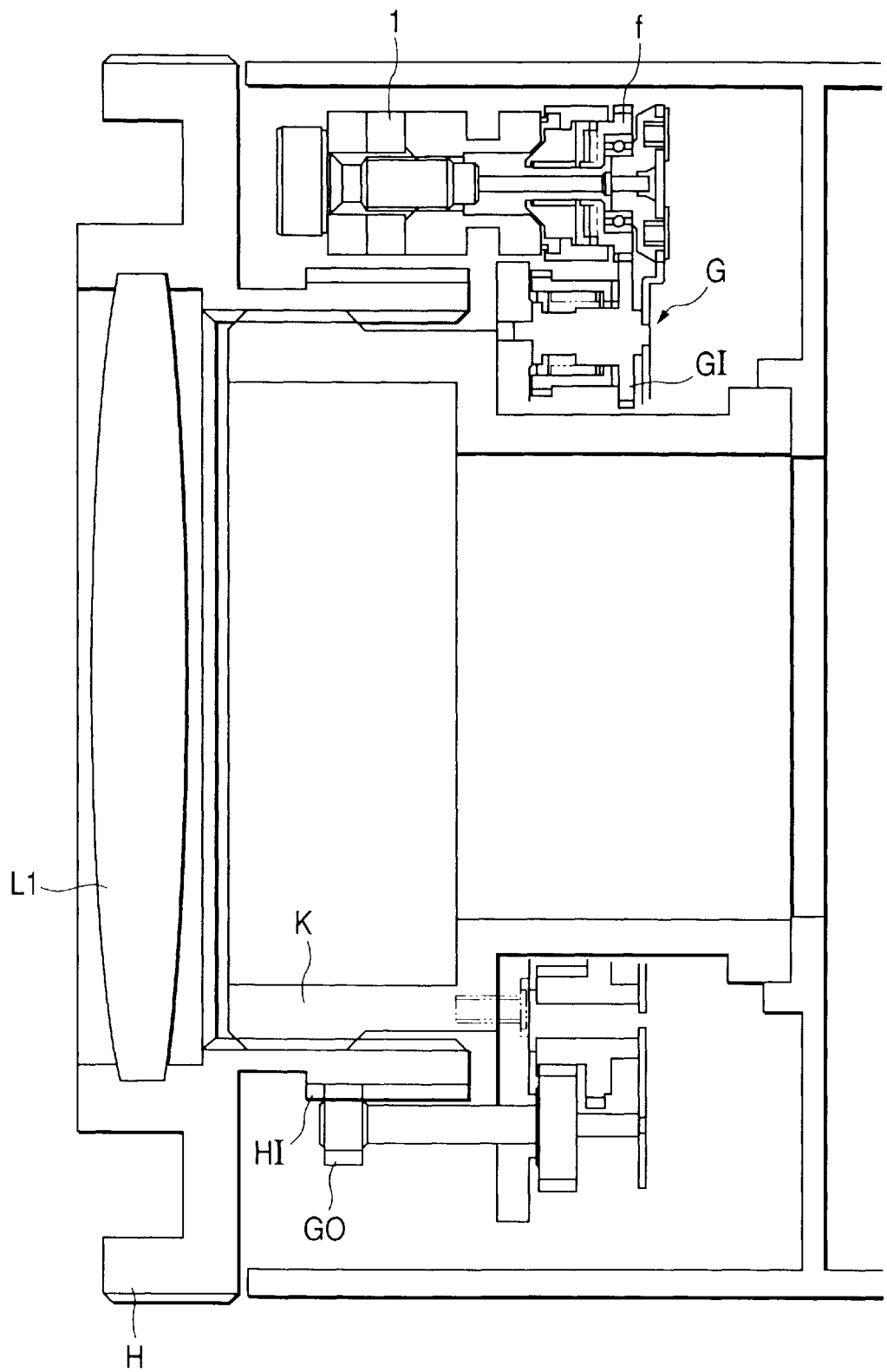
FIG. 9 is a sectional view showing the arrangement of a driving apparatus for driving a lens using the vibration type motor of the present invention.

FIG. 9 shows a driving apparatus for driving a lens using the ultrasonic wave motor according to the present invention.

The basic structure of this rod-like ultrasonic wave motor is the same as that in the prior art, but a circuit for detecting wear is attached thereto.

A gear f assembled integrally with the ultrasonic wave motor meshes with an input gear GI of a gear transmission mechanism G, and its output gear GO meshes with a gear HI formed on a lens holding member H for holding a lens Ll. The lens holding member H helicoid-couples to a stationary cylinder K, and is rotated by the driving force of the ultrasonic wave motor via the gear transmission mechanism G, thus focusing the lens.

What is claimed is:

1. A vibration type motor device usable with a power supply having a power supply voltage level, said vibration type motor device comprising:
   a vibration member;
   an electro-mechanical energy conversion element portion that generates vibration in said vibration member in response to an applied drive frequency signal, thereby generating a driving force in said vibration member;
   a driving circuit connected to said power supply that generates a drive frequency signal, the drive frequency signal being a pulse signal having a pulse voltage level that varies directly with the power supply voltage level and includes pulses, each pulse having a pulse width and a period; and
   a pulse width control circuit that controls the driving circuit so as to vary the pulse width of a pulse in the pulse signal in accordance with the power supply voltage level, independent of the period of the pulse.

2. A vibration type motor device usable with a power supply, said vibration type motor device comprising:
   a vibration member;
   an electromechanical energy conversion element portion that generates vibration in said vibration member in response to an applied drive frequency signal, thereby generating a driving force in said vibration member, said electromechanical energy conversion element portion having one side surface and an other side surface;
   a driving circuit connected to said power supply that generates drive frequency signals, the drive frequency signals including a first pulse signal and a second pulse signal, each of the first pulse signal and the second pulse signal including pulses, each pulse having a pulse width and a period, the second pulse signal having a phase which is different from a phase of the first pulse signal, said driving circuit applying the first pulse signal to the one side surface of the electro-mechanical energy conversion element portion, and applying the second pulse signal to the other side surface of the electro-mechanical energy conversion element portion; and
   a pulse width control circuit that controls said driving circuit so as to vary the pulse width of a pulse of at least one of the first pulse signal and the second pulse signal in accordance with the power supply voltage level, independent of the period of the pulse.

3. A vibration type motor device according to claim 1, wherein said pulse width control circuit controls said driving circuit so as to increase the pulse width of the pulse as the power supply voltage level decreases.

4. A vibration type motor device according to claim 1, wherein said pulse width control circuit controls said driving circuit so as to generate the pulse signal by selectively alternating a pulse having a pulse width larger than a pulse width used when the power supply voltage level is higher at least than first value, and a pulse having a pulse width smaller than the pulse width of the pulse when the power supply voltage level is less than the first value.

5. A vibration type motor device according to claim 2, wherein said pulse width control circuit controls said driving circuit so as to vary the pulse width of a pulse of only one of the first pulse signal and the second pulse signal.

6. A vibration type motor device according to claim 2, wherein said pulse width control circuit controls said driving circuit so as to vary the pulse width of a pulse of the first pulse signal and the pulse width of a pulse of the second pulse signal.

7. A vibration type motor device according to claim 2, wherein said driving circuit comprises a first series circuit including first and second switching elements, a second series circuit including third and fourth switching elements, said second series circuit being connected in parallel with said first series circuit, a power supply circuit for supplying electric power to said first series circuit and said second series circuit, and a control unit for alternately turning on/off said first and second switching elements at on-off timings, and for alternately turning on/off said third and fourth switching elements at timings different from the on-off timings of said first and second switching elements, and wherein said driving circuit generates the first pulse signal by turning on/off said first and second switching elements and generates the second pulse signal by turning on/off said third and fourth switching elements.

8. A vibration type motor device according to claim 1, wherein said pulse width control circuit controls said driving circuit so as to maintain a constant pulse width upon starting up said vibration type motor device, and thereafter controls said driving circuit so as to vary the pulse width after a predetermined movement of said vibration type motor device is started using the constant pulse width.

9. A vibration type motor device according to claim 1, wherein said pulse width control circuit controls said driving circuit so as to maintain a constant pulse width upon shutdown of said vibration type motor device.

10. A vibration type motor device according to claim 2, wherein said pulse width control circuit controls said driving circuit so as to increase the pulse width of the pulse as the power supply voltage level decreases.

11. A vibration type motor device according to claim 2, wherein said pulse width control circuit controls said driving circuit so as to generate the pulse signal by selectively alternating a pulse having a pulse width larger than a pulse width generated when the power supply voltage level is higher at least than a first value, and a pulse having a pulse width smaller than the pulse width of the pulse, when the power supply voltage level is less than the first value.

12. A driving device usable with a vibration type motor apparatus and a power supply having a power supply voltage level, the vibration type motor apparatus including a vibration member and an electro-mechanical energy conversion element portion that generates a vibration in the vibration member in response to an applied drive frequency signal, thereby generating a driving force in the vibration member, the driving device comprising:

a driving circuit connected to said power supply that generates a drive frequency signal, the drive frequency signal being a pulse signal having a voltage level that varies directly with the power supply voltage level and including pulses, each having a pulse width and a period; and a pulse width control circuit that controls the driving circuit so as to selectively vary the pulse width of a pulse in the pulse signal in accordance with the power supply voltage level, independent of the period of the pulse.

13. A driving device for use with a vibration type motor apparatus and a power supply having a power supply voltage level, the vibration type motor apparatus including a vibration member and an electro-mechanical energy conversion element portion that generates a vibration in the vibration member in response to an applied drive frequency signal, thereby generating a driving force in the vibration member, the electro-mechanical energy conversion element portion having one side surface and an other side surface, the driving device comprising:

a driving circuit connected to said power supply that generates drive frequency signals, the drive frequency signals including a first pulse signal and a second pulse signal, each of the first pulse signal and the second pulse signal including pulses, each pulse having a pulse width and a period, the second pulse signal having a phase which is different from a phase of the first pulse signal, said driving circuit applying the first pulse signal to the one side surface of the electro-mechanical energy conversion element portion, and applying the second pulse signal to the other side surface of the electro-mechanical energy conversion element portion; and a pulse width control circuit that controls said driving circuit so as to vary the pulse width of a pulse of at least one of the first pulse signal and the second pulse signal in accordance with the power supply voltage level, independent of the period of the pulse.

14. A driving device according to claim 12, wherein said pulse width control circuit controls said driving circuit so as to increase the pulse width of the pulse as the power supply voltage level decreases.

15. A driving device according to claim 12, wherein said pulse width control circuit controls said driving circuit so as to generate the pulse signal by selectively alternating a pulse having a pulse width larger than a pulse width used when the power supply voltage level is higher at least than first value, and a pulse having a pulse width smaller than the pulse width of the pulse when the power supply voltage level is less than the first value.

16. A driving device according to claim 13, wherein said pulse width control circuit controls said driving circuit so as to vary the pulse width of a pulse of only one of the first pulse signal and the second pulse signal.

17. A driving device according to claim 13, wherein said pulse width control circuit controls said driving circuit so as to vary the pulse width of a pulse of the first pulse signal and the pulse width of a pulse of the second pulse signal.

18. A driving device according to claim 13, wherein said driving circuit comprises a first series circuit including first and second switching elements, a second series circuit including third and fourth switching elements, said second series circuit being connected in parallel with said first series circuit, a power supply circuit for supplying electric power to said first series circuit and said second series circuit, and a control unit for alternately turning on/off said first and second switching elements at on-off timings, and for alternately turning on/off said third and fourth switching elements at timings different from the on-off timings of said first and second switching elements, and wherein said driving circuit generates the first pulse signal by turning on/off said first and second switching elements and generates the second pulse signal by turning on/off said third and fourth switching elements.

19. A driving device according to claim 12, wherein said pulse width control circuit controls said driving circuit so as to maintain a constant pulse width upon starting up the vibration type motor apparatus, and thereafter controls said driving circuit so as to vary the pulse width after a predetermined movement of the vibration type motor apparatus is started using the constant pulse width.

20. A driving device according to claim 12, wherein said pulse width control circuit controls said driving circuit so as to maintain a constant pulse width upon shutdown of the vibration type motor apparatus.

21. A driving device according to claim 13, wherein said pulse width control circuit controls said driving circuit so as to increase the pulse width of the pulse as the power supply voltage level decreases.

22. A driving device according to claim 13, wherein said pulse width control circuit controls said driving circuit so as to generate the pulse signal by selectively alternating a pulse having a pulse width larger than a pulse width generated when the power supply voltage level is higher at least than a first value, and a pulse having a pulse width smaller than the pulse width of the pulse, when the power supply voltage level is less than the first value.

* * * * *

UNITED STATES PATENT AND TRADEMARK OFFICE
CERTIFICATE OF CORRECTION

PATENT NO. : 6,121,714

DATED : September 19, 2000

INVENTOR(S): AKIO ATSUTA

It is certified that error appears in the above-identified patent and that said Letters Patent is hereby corrected as shown below:

COLUMN 1:

Line 18, "H as" should read --has--.

COLUMN 2:

Line 64, "nominal" should read --or nominal--.

COLUMN 3:

Line 1, "device" should read --device,--.

Line 9, "or" should read --on--.

Line 10, "value" should be deleted.

Line 41, "the" (second occurrence) should read --a--,

COLUMN 4:

Line 11, "of" (second occurrence) should read --in--.

Line 42, "180'" should read --180°--.

Line 56, "90'" should read --90°--.

Line 66, "this" should read --the--.

UNITED STATES PATENT AND TRADEMARK OFFICE
CERTIFICATE OF CORRECTION

PATENT NO. : 6,121,714

DATED : September 19, 2000

INVENTOR(S): AKIO ATSUTA

It is certified that error appears in the above-identified patent and that said Letters Patent is hereby corrected as shown below:

<u>COLUMN 5</u>:

Line 6, "circuits" should read --circuit--.

Line 49, "same" should read --same input power--.

Line 52, "widths" should read --width--.

Line 54, "obtained" should read

--maintained constant so as--.

<u>COLUMN 6</u>:

Line 7, "range(2)" should read --range(2),--.

Line 30, "width range (2)." should read

--width as in range (2).--.

Line 34, "range (2)," should read --range (2)),--.

Line 44, "remaining signal" should read

--remaining phase signal--.

Line 62, "thus" should read --then--.

UNITED STATES PATENT AND TRADEMARK OFFICE
CERTIFICATE OF CORRECTION

PATENT NO. : 6,121,714

DATED : September 19, 2000

INVENTOR(S): AKIO ATSUTA

Page 3 of 4

It is certified that error appears in the above-identified patent and that said Letters Patent is hereby corrected as shown below:

COLUMN 7:

Line 1, "range f" should read --range $f_1$--.

Line 14, "level 1" should read --level--.

Line 15, "with level" should read --with voltage level--.

Line 16, "1" should be deleted.

COLUMN 8:

Line 27, "than first value," should read

--than a first value,--.

UNITED STATES PATENT AND TRADEMARK OFFICE
CERTIFICATE OF CORRECTION

PATENT NO. : 6,121,714

DATED : September 19, 2000

INVENTOR(S): AKIO ATSUTA

It is certified that error appears in the above-identified patent and that said Letters Patent is hereby corrected as shown below:

<u>COLUMN 10</u>:

Line 7, "than first value, " should read

--than a first value--.

Signed and Sealed this

Twenty-second Day of May, 2001

*Attest:*

NICHOLAS P. GODICI

*Attesting Officer*     *Acting Director of the United States Patent and Trademark Office*